United States Patent

Suzuki et al.

[11] Patent Number: 6,054,546
[45] Date of Patent: Apr. 25, 2000

[54] SOLVENT-FREE TWO-LIQUID TYPE NORMAL TEMPERATURE CURABLE LIQUID POLYMER COMPOSITION AND A USE THEREOF

[75] Inventors: Tomio Suzuki, Tokyo; Kimie Watanabe, Chiba, both of Japan

[73] Assignee: Suzuki Sangyo Co., Ltd., Tokyo, Japan

[21] Appl. No.: 09/017,574

[22] Filed: Feb. 3, 1998

[30] Foreign Application Priority Data

Feb. 4, 1997 [JP] Japan .................................. 9-021129

[51] Int. Cl.$^7$ .................................................. C08G 77/06

[52] U.S. Cl. ........................... 528/15; 524/267; 524/730; 524/731; 528/16; 528/18; 528/19; 528/20; 528/12

[58] Field of Search ................................... 528/15, 16, 18, 528/19, 12, 20; 524/267, 730, 731

[56] References Cited

U.S. PATENT DOCUMENTS

| | | | |
|---|---|---|---|
| 4,721,766 | 1/1988 | Inoue et al. | 528/18 |
| 4,734,479 | 3/1988 | Iniue et al. | 528/18 |

FOREIGN PATENT DOCUMENTS

| | | |
|---|---|---|
| 2-016143 | 1/1990 | Japan . |
| 6-240060 | 8/1994 | Japan . |

*Primary Examiner*—Melvyn I. Marquis
*Attorney, Agent, or Firm*—Armstrong, Westerman, Hattori, McLeland & Naughton

[57] ABSTRACT

Provided is a solvent-free two-liquid type normal temperature curable liquid polymeric composition which comprises (I) as a first liquid, a liquid composition comprising (A) an organosiloxane component comprised of (a) one or more liquid organopolysiloxanes of the general formula:

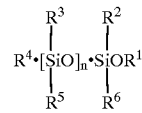

wherein $R^1$ stands for a hydrogen atom, an alkyl group with 1–5 carbon atoms or an acyl group; $R^2$ to $R^6$ are the same or different and each stands for a hydrogen atom, —$OR^1$ or a univalent hydrocarbon group; and n for an integer of 1–15, (b) a crosslinking agent comprising one or more organometallic compounds of the general formula:

$$R^7_p M \cdot (OR^1)_{3-p}$$

or $$R^7_m Q \cdot (OR^1)_{4-m}$$

wherein M stands for aluminum or boron element; Q for silicon, titanium or zirconium element; $R^1$ for a hydrogen atom, an alkyl group with 1–5 carbon atoms, an acyl group or an oxime group; $R^7$ for a hydrogen atom, —$OR^1$ or a univalent hydrocarbon group; p for an integer of 1 or 2; and m for an integer of 1–3, and (c) a curing catalyst which is one or more organometallic compounds of zinc, cobalt, aluminum or tin element and has been incorporated with a catalytic reaction blocking agent, and (B) an organosiloxane carrying a glycidyl group, and (II) as a second liquid, (C) a solvent-free acrylic copolymer carrying a tertiary amino group which has been adjusted in viscosity with a silicone. This composition is excellent in various physicochemical characteristics and is very suitable for use in paints and binders.

9 Claims, No Drawings

SOLVENT-FREE TWO-LIQUID TYPE NORMAL TEMPERATURE CURABLE LIQUID POLYMER COMPOSITION AND A USE THEREOF

BACKGROUND OF THE INVENTION

1. Field of the Invention

The present invention relates to a substantially solvent-free, two-liquid type polymeric composition which is curable at a normal temperature and to a use of the polymeric composition, for example, as a binder or a paint. More particularly, the present invention relates to a substantially solvent-free, two-liquid type, normal temperature curable liquid polymeric composition which is excellent in closely adhering property, bending-resistance, moist-applicability, hard combustibiity, gas barrier property, impact resistance, heat-resisting property, alkali-resisting property, and water-permeability resistance and is thus utilizable as paints or binding agents as well as an intended use thereof.

2. Description of the Prior Art

From the past, a solvent plays an important role in paints and occupies, in view of its amount used, 45–50% of starting materials for paints. The sort of solvents is indeed more than 50 even in case of counting up the main ones. In particular, organic solvents are above all an important and indispensable material for dissolving or dispersing a coating film-forming material, imparting fluidity to a paint and affording a painting aptitude and a coating film-forming ability.

However, organic solvents are highly inflammable and are appointed by the authorities as dangerous materials. What is more, there may be a risk of causing various lesions when a human body is brought into contact with such organic solvents (e.g. anesthetic action, disorder of central or autonomic nervous system, hepatic or renal disorder, inflammation of skin or eyes, etc.). During painting operation, therefore, it is a matter of course that uppermost attention has to be taken for hygienic administration of workers.

Standing on the viewpoint that hygienic administration has to be undertaken preferentially, workers handling paints containing organic solvents are forced to take a gas mask in the course of their work so that their working efficiency is seriously damaged. On the other hand, organic solvents are widely recognized to have a considerable fault that they trigger pollution of global environment. In the current status, therefore, the use of a paint or binder containing an organic solvent as its indispensable ingredient tends to be avoided as far as possible.

Being anxious about such circumstance, for example, the Road Bureau in the Ministry of Construction in our country has issued a big project as from June of 1993, in accordance with the governmental policy, for developing a solvent-free paint in which the amount of a solvent is seriously decreased as well as an aqueous paint using water in place of a solvent for practical use, in consideration of hygienic administration of workers, environmental securities, working efficiency, etc. in painting work of bridges. Thus, studies have now been initiated for 4 developing items of (1) development of materials, (2) development of new painting methods, (3) painting for trial tests and (4) establishment of maintenance and administration.

In aqueous paints, no problem takes place in aspect of hygienic administration of workers. Whereas, deterioration of physical characteristics of the resultant paints is unavoidable with the fact that a policy of countermeasure for treating waste water on paining has not yet been established. Under such circumstances, it comes to public attention with anxiety that pollution of water and soil may be caused thereby. Accordingly, the use of an aqueous paint cannot necessarily be said to be preferable.

The present inventors had paid prompt attention to such situation and developed a solvent-free normal temperature curable organosiloxane composition at the time of 1991. A patent application based on this technical finding was already filed and published as Japanese Patent Publn. No. Hei. 7-72250 (1995) aiming at providing a new material capable of achieving the aforesaid object.

The organosiloxane composition of this patent is solvent-free and excellent in various physical properties so that it is applicable to the use in various fields. In recent years, however, a polymeric composition as a paint is required in this art which is enhanced in some physical properties such as bending-resistance (deformation compliance of the material), moist applicability, hard combustibility, gas barrier property, impact resistance, heat-resisting property, etc. in addition to the properties owned by the composition of the above patent.

BRIEF SUMMARY OF THE INVENTION

It is an object of the present invention to provide a novel solvent-free two-liquid type normal temperature curable liquid polymeric composition.

It is another object of the present invention to provide a novel solvent-free polymeric composition which is excellent in various physicochemical properties which is suitable for use in paints and binders.

It is still another object of the present invention to provide a novel solvent-free two-liquid type polymeric composition which comprises an ingredient containing a tertiary amino group and the other ingredient containing a glycidyl group is thus capable of being bound strongly to a material to be applied.

It is still further object of the present invention to use the novel solvent-free two-liquid type liquid polymeric composition for coating a material therewith or binding plural articles therewith to impart excellent physicochemical properties to the material.

It is still further object of the present invention to provide a paint comprising the polymeric composition and additives involving pigments and/or coloring agents, which gives a coat possessing excellent physicochemical characteristics.

It is still further object of the present invention to provide a binder comprising the polymeric composition and optional additives which attains strong adhesion with excellent physicochemical characteristics.

Other and further objects, features and advantages of the present invention will be apparent more fully from the following description.

As a result of extensive researches made to satisfy the newly added demand for the solvent-free polymeric composition, it has now been found that the aforesaid objects can be achieved by a new polymeric composition capable of imparting various excellent physicochemical characteristics to a material to be applied which can be obtained by converting the polymeric composition into a two-liquid type composition containing two ingredients which can be reacted each other. The present invention has been accomplished on the basis of the above finding.

The solvent-free liquid polymeric composition of the present invention is of important characteristics in that a liquid organopolysiloxane is employed as a main ingredient to which a solvent-free acrylic copolymer carrying a tertiary amino group is incorporated to form a first liquid while an organosiloxane carrying a glycidyl group functioning as a curing agent is used as a second liquid.

DETAILED DESCRIPTION OF THE INVENTION

In accordance with the present invention, there is provided a solvent-free two-liquid type normal temperature curable liquid polymeric composition which comprises:

(I) as a first liquid, a liquid composition comprising:

(A) an organosiloxane component comprised of:

(a) one or more liquid organopolysiloxanes of the general formula:

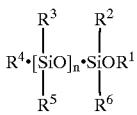

(1)

wherein $R^1$ stands for a hydrogen atom, an alkyl group with 1–5 carbon atoms or an acyl group; $R^2$ to $R^6$ are the same or different and each stands for a hydrogen atom, —$OR^1$ or a univalent hydrocarbon group; and n is for an integer of 1–15, (b) a crosslinking agent comprising one or more organometallic compounds of the general formula:

$$R^7_p M.(OR^1)_{3-p} \quad (2)$$

or $$R^7_m Q.(OR^1)_{4-m} \quad (3)$$

wherein M stands for aluminum or boron element; Q for silicon, titanium or zirconium element; $R^1$ for a hydrogen atom, an alkyl group with 1–5 carbon atoms, an acyl group or an oxime group; $R^7$ for a hydrogen atom, —$OR^1$ or a univalent hydrocarbon group; p for an integer of 1 or 2; and m for an integer of 1–3, and (c) a curing catalyst which is one or more organometallic compounds of zinc, cobalt, aluminum or tin element and has been incorporated with a catalytic reaction blocking agent, and (B) an organosiloxane carrying a glycidyl group, and (II) as a second liquid, (C) a solvent-free acrylic copolymer carrying a tertiary amino group which has been adjusted in viscosity with a silicone.

In accordance with the present invention, there is also provided the aforesaid liquid polymeric composition wherein the solvent-free acrylic copolymer (C) is a substantially solvent-free acrylic copolymer formed by substituting at least 95% of an organic solvent of an acrylic copolymer carrying a tertiary amino group by a silicone.

In accordance with the present invention, there is further provided the aforesaid liquid polymeric composition wherein the solvent-free acrylic copolymer (C) is an acrylic copolymer carrying a tertiary amino group after completion of the polymerization step having been adjusted in viscosity with a silicone.

In accordance with the present invention, there is still further provided the aforesaid liquid polymeric composition wherein the solvent-free acrylic copolymer (C) has an amine number of 19 and an acid number of not more than 3.

In accordance with the present invention, there is still further provided the aforesaid liquid polymeric composition wherein a proportion of the above (A)/(B) is 40/60.

In accordance with the present invention, there is still further provided the aforesaid liquid polymeric composition wherein a mixing ratio of the first liquid/the second liquid is 45-55/55-45.

In accordance with the present invention, there is still further provided the aforesaid liquid polymeric composition wherein 400 parts by weight of one or more additives (d) selected from the group consisting of an activating agent, a filler, a pigment, and a coloring agent are incorporated per 100 parts by weight of the liquid organopolysiloxane (a) in the first liquid composition.

In accordance with the present invention, there is still further provided a paint comprising the aforesaid liquid polymeric composition.

In accordance with the present invention, there is yet further provided a binder comprising the aforesaid liquid polymeric composition.

It is an important gist of the present invention that the solvent-free normal temperature curable liquid polymeric composition is composed of (1) a liquid composition, as a first liquid, comprising a solvent-free normal temperature curable organosiloxane composition as disclosed in Japanese Patent Publn. No. Hei. 7-72250 and an organosiloxane carrying a gycidyl group and (2) a solvent-free acrylic copolymer carrying a tertiary amino group, as a second liquid, adjusted in viscosity with a silicone.

The polymeric composition of the present invention is featured by possessing (I) curing characteristics of the organosiloxane component (A) in the first liquid jointly with (II) curing characteristics of the organosiloxane (B) carrying a glycidyl group and the solvent-free acrylic copolymer. As will be evident from Examples given hereinafter, the liquid polymer composition of the present invention exhibits extremely remarkable usefulness in addition to excellent advantages coming from "being solvent-free".

By the term "solvent-free" is meant herein that any of the organic solvents is not contained substantially therein.

Below is a detailed explanation on the individual components of the polymeric composition.

(A) Organosiloxane Component (a) Liquid Organopolysiloxane

An organosiloxane used as a main component of the present invention is known, together with an organosilane, as a typical organic silicon compound. In general, a rational formula $R_3SiO(R_2SiO)_nSiR_3$ or $(R_2SiO)_n$ is give for organosiloxane compounds. As shown in the rational formula, organosiloxanes are composed of a siloxane linkage consisting of Si—O bond which is involved in the category of inorganic compounds and an organic bond (e.g. alkyl group, phenyl group, aryl group, alkoxy group, acyloxy group, etc.). Thus, the organosiloxane has a dual property; the property of inorganic compounds due to a silanol bond (—Si—OH) and the property of organic compounds due to —C—C—or =C=O bond.

In comparison of intratomic bond energies between the C—C bond and the Si—O bond, the energy of C—C bond is 84.9 kcal/mol and that of C—O bond is 80.9 kcal/mol while the energy of Si—O is 106 kcal/mol, showing about 25% greater then the former two. It is therefore understood that the intratomic bond energy of the siloxane linkage is more stable against physical energy such as heat or light and chemical energy such as oxidation than the intratomic bond energy of constituent units in organic compounds.

About 50% of the siloxane linkage is said to be an ionic bond. Its bond distance is long and its electronic density is low, so that rotation of the bond is easy and bond angle will be changed with a relatively small degree of energy. It follows therefore that a chain due to siloxane linkage is, as compared with a chain due to C—C bond, better in bending strength and in flexibility, thus affording a material furnished with flexibility and strength against impact due to heat and physical energy.

As the organosiloxane exhibits having Si—O bonds are of the properties different in a number of aspects from organic compounds constructed by —C—C—and/or C—O bonds, the organosiloxane is obviously distinguished from organic compounds which are especially weak against oxidation or combustion.

A mechanism of polymerization of organosiloxanes for the formation of cured products is caused by promotion of a condensation reaction or an addition reaction of reactive siloxanes. The condensation reaction of an organosiloxane concerned with the present invention proceeds in such manner that a synthetic reaction to form a linear oligomer is initiated at a first stage and successively a reaction of the oligomer with water or moisture for splitting off an alcohol, oxime, acetic acid and the like whereby a condensation reaction is promoted to form a polymeric cured product having a reticulate structure.

In order to make the polymeric composition of this invention incombustible and heat-resisting, it is preferable that the fundamental skeleton of the polymer is constructed by incombustible and strong Si—O—Si bonds and that the content of silicon value in the liquid organopolysiloxane (a) forming such Si—O—Si bonds is kept at a high concentration of at least 50% by weight, especially at least 53% by weight in terms of $SiO_2$.

For maintaining the concentration of silicon value as high as at least 50% by weight (preferably at least 53% by weight) in terms of $SiO_2$, it is possible to polymerize the organosiloxane up to at least an oligomer thereof. This can be made by increasing the value of n in [—Si—O—]$_n$, of the general formula (1) to at least 2.

It is important in the present invention that the liquid organosiloxane contains organosilicon groups wherein the organic groups is connected directly to the silicon atom without interposing the oxygen atom therebetween. This point is different from inorganic siloxanes where the oxygen atom is interposed between the silicon atom and the substituent. In particular, in order to effectively exhibit various physicochemical characteristics such as flexibility, adhering property, water-repellent property, water-impermeability, and alkali-resisting property not owned by a polymer having inorganic siloxane linkages, it is preferable that the liquid organosiloxane carries organosilicon groups comprising organic groups which are large enough to cover the siloxane bonds, for example, alkyl groups, phenyl groups, glycidoxy groups, methacryloxy groups.

Examples of the liquid organopolysiloxane suitably employed in the present invention include an oligomer of methylmethoxysiloxane; a silicon resin containing alkyl groups, fluoroalkyl groups, vinyl groups, allyl groups, alkenyl groups, phenyl groups, naphthyl groups, aryl groups, cyclohexyl groups, cyclohexenyl groups, benzyl groups, aralkyl groups, aralkylaryl groups, epoxy groups and the like within a range from 1/3 to 2/2 in the ratio of R/Si; a silicon resin preferably containing methyl groups or phenyl groups; an oligomer of tetramethyl or tetraethyl orthosilicate; and an oligomer of methyl- or vinyltriacetoxysilane. It is preferable to use these compounds singly or a mixture of at least two.

(b) Crosslinking Agent

In order to obtain the liquid composition of this invention in the form of a high molecular polymer having a flexible, dense, and tough three-dimensional reticulate structure, the use of a crosslinking agent (b) is necessary which promotes not only the polymerization at the terminal ends of a polysiloxane but also the polymerization in various locations in the middle of the polysiloxane in such manner that the crosslinked bonds may be elongated three-dimensionally, i.e. in up-and-down and left-and-right directions. As the crosslinking agent (b) capable of attaining such purpose, one or more of the following compounds can be used in the present invention:

(i) a liquid organic compound of aluminum or boron represented by the general formula (2) which contains functional pendant OR groups enabling a condensation reaction between alkoxy groups and silanol groups:

$$R^7_p M.(OR^1)_{3-p} \qquad (2)$$

and (ii) an organometallic compound of the general formula (3):

$$R^7_m Q.(OR^1)_{4-m} \qquad (3)$$

wherein M stands for aluminum or boron element; Q for silicon, titanium or zirconium element; $R^1$ for a hydrogen atom, an alkyl group with 1–6 carbon atoms, an acyl group or an oxime group; $R^7$ for a hydrogen atom, —$OR^1$ or a univalent hydrocarbon group; p for an integer of 1 or 2; and m for an integer of 1–3.

Typical examples of the crosslinking agent (b) are shown below.

In case M in the general formula (2) is aluminum element, an organometallic compound wherein p is 0 and $R^1$ is isopropyl or sec-butyl is preferable. In case M is boron element, an organometallic compound having a trialkoxy group wherein p is 0 and $R^1$ is methyl, ethyl or butyl is preferable.

In case Q in the general formula (3) is silicon element, tetramethyl or -ethyl orthosilicate wherein $R^7$ is methoxy group or ethoxy group and organometallic compounds such as methyltrimethoxysilane, methyltrimethoxysilane, vinyltriacetoxysilane, vinyltriethoxysilane, phenyltrimethoxysilane, γ-glycidoxypropylmethoxysilane, dimethylmethyltrifluoropropylsilane, γ-methacryloxypropyltrimethoxysilane, γ-methacryloxypropylmethyldimethoxysilane, etc. are preferable.

In case Q in the general formula (3) is titanium element, the organometallic compounds such as tetraisopropyl titanate, tetra-n-butyl titanate, etc. are preferable. In case Q in the general formula (3) is zirconium element, thee organometallic compounds such as tetraethyl zirconate, tetraisopropyl zirconate and tetra-n-butyl zirconate are preferable.

It is preferable for displaying the crosslinking effect that the organometallic compounds are monomeric form. However, it is effective without damaging the object of the present invention to use a dimer of the compound, i.e. the compound initiated to undergo polymerization. It is also preferable to use the organometallic compound singly or in a combination of at least two according to the intended purpose or workability. The crosslinking effect of the siloxane polymeric composition is effectively enhanced on one hand and advantageous properties such as flexibility and adhesivity are effectively imparted to the end product by incorporating the liquid composition with the crosslinking agent of the present invention in an amount not more than 70% by weight, preferably not more than 65% by weight.

(c) Curing Accelerator

The curing catalyst (c) used in the present invention is selected from one or more of the metal-containing organic compounds containing zinc, cobalt, aluminum or tin element for achieving the object of the present invention. It is a matter of course that the aforesaid organometallic compounds containing titanium or zirconium used as the crosslinking agent (b) of the present invention are considered to fill the role of the curing catalyst.

Illustrative of the metal-containing organic compound utilized as the curing accelerator are, for example, zinc naphthenate, cobalt octanoate, cobalt naphthenate, aluminum trimethoxide, aluminum tris(acetylacetonate), aluminum tri(n-butoxide), diacetyl tin diacetate, dibutyl tin dilaurate, dibutyl tin diacetate, dioctyl tin dilaurate, diacetyl tin dioctoate, tin octanoate, and other widely known general curing accelertors.

It is important in the present invention that one-liquid storage stability of the composition of the present invention comprising a ternary mixed liquid of (a) liquid organopolysiloxane, (b) the crosslinking agent and (c) the curing accelerator can be secured with certainty for a long period of time by previously blocking the curing accelerator (c) with a keto-enol tautomeric compound.

As is well known, the keto-enol tautomeric compound wherein a keto-form and an enol-form are coexistent in an equilibrium relation has a chelate bond due to hydrogen bond in the molecule thereof. A typical compound of the keto-enoe tautomer is ethyl acetoacetate that is used suitably in the present invention. Examples of the other keto-enol tautomeric compound used in the present invention include a malonic acid diester; a β-diketone such as acetylacetone, benzoylacetone or dibenzoylmethane; a ketone having a hydroxy group in β-position such as diacetone alcohol; an ester having a hydroxy group in β-position such as methyl salicylate; and a compound derived from the above compound by replacing the alkyl group therein by a trifluoromethyl group.

The amount of the keto-enol tautomeric compound can be determined by previously carrying out a simple preliminary experiment although the amount varies according to the sort of the curing accelerator (c) used, a proportion thereof and a curing condition. In general, the tautomeric compound is incorporated in an amount of not more than 50% by weight into the curing accelerator (c) for attaining the blocking effect. In the present invention, a reaction velocity of condensation reaction of the curing accelerator (c) can be delayed with an alcohol such as a monohydric to polyhydric alcohol.

Illustrative of the alcohol effectively used in the present invention as the delaying agent are, for example, methyl alcohol, ethyl alcohol, propyl alcohol, butyl alcohol, amyl alcohol or the like monohydric alcohol; and a polyhydric alcohol such as ethylene glycol, propylene glycol, glycerol or erythritol.

The amount of an alcohol used for delaying the reaction velocity can easily be determined by previously carrying out a simple preliminary experiment although the amount varies according to the sort and proportion of the curing accelerator (c) used, curing condition and the degree of delaying desired. In general, the amount of an alcohol is previously incorporated in an amount not more than 50% by weight into the curing accelerator (c) lest the catalytic effect should be damaged. It is a matter of course that in case the keto-enol tautomeric compound used as blocking agent and the alcohol used as delaying agent are employed jointly, a total of both ingredients is desirably incorporated in an amount not more than 50% by weight into the curing accelerator (c).

The amount of the curing accelerator (c) blocked with the enol-keto tautomeric compound, the curing accelerator (c) incorporated with the alcohol as delaying agent, and the curing accelerator alone is generally within the range of 0.1–10% by weight although the amount varies according to the sort and proportion of the liquid organopolysiloxane (a) and the crosslinking agent (b) and further the sort and proportion of the curing accelerator (c). Especially in case the organometallic compound containing aluminum, boron, titanium or zirconium is incorporated as the crosslinking agent, the amount of the curing accelerator (c) may be small as far as possible. The curing condensation reaction can smoothly be promoted under the above proportion condition to obtain the polymric product aimed at in the present invention satisfactorily.

(d) Other Ingredients

The first liquid of the present invention may be incorporated with an additive (d) selected from the group consisting of a powdery activating agent having a size of not more than 200 μm, a filler, a pigment and a coloring agent according to physical property, function, applicability, use and object required for the polymeric composition. These additive (d) is used singly or in combination of at least two in an amount of 1–500 parts by weight, preferably 10–400 parts by weight per 100 parts by weight of the organosiloxane composition within the extent where workability and various properties are not damaged. Concerning the time of incorporating the fillers, however, it is preferable that these additive are incorporated into the composition prior to incorporation of the curing accelerator (c). When the fillers contain moisture or a substance containing OH groups, it is important that the fillers must be used after they are subjected to a treatment step for removing moisture or such substance, for example, drying or digesting step specified in the present invention. The sort and nature of the utilizable additive (d) are given hereunder.

As the activating agent are used powdery materials of compounds containing boric acid, compounds containing chromic acid and compounds containing phosphoric acid. In case a metal such as iron is selected as a substrate, the organosiloxane composition previously incorporated with such additive tends to improve adhesiveness between the substrate and a coating material of the organosiloxane and a binder. Powdery materials, modified materials and processed materials selected from borosilicate glass, zinc borate, boron phosphate, an alkali earth metal borate, an alkali metal borate, zinc chromate, strontium chromate, lead chromate, silicon phosphate, aluminum phosphate, zinc phosphate, an alkali earth metal phosphate and the like are used as the activating agent containing boric acid, chromic acid and phosphoric acid.

A powdery material having a grain size not more than 200 μm selected from a powder of metal or alloy such as stainless steel, silicon, zinc, aluminum, or iron, glass powder, porcelain powder, diamond powder, silica oxide (silica sand powder, silica hume, etc.), molten aluminum powder, magnesia powder, calcium carbonate, zircon sand, various clays such as bentonite, smectite, gairome clay, refined kibushi clay, etc., baked clay (calcined bauxite, montmorillonite, kaolin, etc.), gypsum, calcium phosphate, magnesium phosphate, barium sulfate, aluminum fluoride, calcium silicate, magnesium silicate, barium silicate, barium carbonate, barium hydroxide, aluminum silicate, glaze having various compositions, talc, mica, fly ash, etc. are used as the filler.

No particular limitation is set for the amount of the filler used, but the amount varies according to the intended use of the composition of the present invention. In case the composition of the present invention is used as a paint for spraying, the amount of the filler is preferably not more than 70 parts by weight per 100 parts by weight of the composition in aspect of workability. On the other hand, in case of spreading the composition with a trowel, the filler is preferably used in an amount of 1–500 parts by weight, especially 10–400 parts by weight per 100 parts by weight of the composition.

As the pigment, an inorganic colored pigment such as titanium dioxide, red oxide, chromium oxide, litharge, carbon black and ultramarine; a baked pigment comprising a colored metal, a colored alloy, a colored non-oxides and oxide; an inorganic functional pigment such as white carbon of silica series, alumina, zinc oxide, magnetic iron oxide, boron nitride, silicon carbide, and various clay powder; and an organic pigment such as a pigment of phthalocyanine series are selected according to the use of the composition.

As the coloring agent, the aforesaid inorganic pigment can also be used, but the known organic pigments and dyes which are widely used in this art can be selected singly or in combination for coloring the organosiloxane composition of the present invention containing organic groups which are possible compatible with such organic pigments or dyes. Thus, the organosiloxane polymeric product with a desired tint and color phase can easily be obtained.

Considering the object and intended use of the organosiloxane composition and also considering various properties of the aforesaid adddive (d) such as grain size distribution, shape, micropore volume, specific surface area, water or oil absorbing property, it is desirable that the additive (d) previously subjected to drying, pulverization, screening, blending, sintering, and/or refining are used singly or in combination. In conformity with workabiity and intended use of the organosiloxane composition, the filler may be a powdery material the surface of which has been treated with various coupling agents or surface active agents.

(B) Organosiloxane Carrying Glycidyl Groups

This component is mixed with the aforesaid component (A) to form the first liquid and carries glycidyl groups together with hydrolyzable silyl groups, the former glycidyl groups being reacted with amino groups in the second liquid [the component (C)] described hereunder to form a cured product. As the component (B), for example, commercially available trade name "A-9585", "A-9586" and "A-9587" marketed from Dainihon Ink Kagaku KK can be used suitably.

No particular limitation exists in the mixing ratio of the component (A) to the component (B), but the ratio (A)/(B) is 20-60/80-40, preferably 35-45/65-55 and more preferably 40/60.

(C) Solvent-free Liquid Acrylic Copolymer Carrying a Tertiary Amino Group

This component is a second liquid and is mixed on use with the first liquid comprising the components (A) and (B) whereby a curing reaction is initiated. It is an important feature that this component is solvent-free and carries a tertiary amino group.

As described hereinbefore, the solvent-free acrylic copolymer means herein that the copolymer is substantially free from any organic solvent and uses a liquid silicone as a viscosity adjusting agent for the copolymer.

As the solvent-free acrylic copolymer are used (i) what is prepared by eliminating a thinner from a commercially available acrylic copolymer carrying a tertiary amino group usually adjusted in viscosity with the thinner and adding the aforesaid silicone as a viscosity-adjusting agent in place of thinner to the copolymer, (ii) what is prepared by adding the silicone to the thinner-containing acrylic copolymer for adjusting the viscosity thereof and heating the mixture in a confined system at a temperature of 130–150° C. whereby the thinner having a low boiling point alone is evaporated to replace it by the silicone, or (iii) what is prepared by adding the silicone for adjusting viscosity to the acrylic copolymer carrying a tertiary amino group just at the stage of the polymerization step having been finished.

A mixing ratio of the second liquid to the first liquid is: the first liquid/the second liquid=45-55155-45. A ratio of about 50/50 is suitably adopted.

The acrylic copolymer carrying a tertiary amino group is commercially available and actually marketed, for example, by Dainippon Ink Kagaku KK (DIC) as a version of the products under the trade name of "Acrydec". Among these products, "A-9521" having an acid number of not more than 3 and an amine number of 19 and belonging to the category of a low molecular weight product is preferably used.

As the silicone for adjusting viscosity, commercially available silicones which is in a grade usually employed as a silane-coupoing agent is used. For example, "KBM 103" or "KR217" marketed from Shin-etsu Kagaku KK can preferably be used.

The reaction between the first liquid and the second liquid is a crosslinking reaction involving a complex reaction mode of (1) a hydrolysis-condensation reaction of the silyl groups caused by moisture in the air, (2) an addition-type crosslinking reaction between the amino groups bound to the acrylic copolymer of the component (c) and the glycidyl groups in the component (B) and (3) the crosslinking reaction of the component (A) itself. Due to the complicated crosslinking reation, the resultant cured product possess excellent physicochemical characteristics.

The first liquid initiates the reaction with the second liquid in the existence of moisture in the air. Thus, the curing reaction is initiated merely by stirring a mixture of both liquids on use.

The curing time depend on the sort and amount of the components (a), (b) and (c) in the component (A) and the proportion of the component (C), but curing time is normally 2–3 hours at 25° C.

According to the present invention, the solvent-free component (A), the organosiloxane component, forms a crosslinking structure containing Si—O bonds so that a cured product possessing various physicochemical characteristics. On the other hand, the component (B), the organosiloxane carrying glycidyl groups, is mixed with the component (C), the solvent-free acrylic copolymer carrying glycidyl groups adjusted in viscosity with the silicone whereby the hydrolysis-condensation reaction of the silyl groups and the addition-type crosslinking reaction between the amino groups bound to the acrylic copolymer and the glycidyl groups of the organosiloxane take place at the same time, thus showing a concurrent occurrence of different modes of crosslinking reaction, to form a cured product excellent in surface hardness, heat-resisting property, bending-resisting compliance, close adhesivity, hard combustibility, water-impermeabilty, acid-resisting property, alkali-resisting property, weather-resisting property, cohesivity, gas barrier property and impact-resisting property. The solvent-free two-liquid type liquid polymeric composition of the present invention which is curable at normal temperature can optionally be incorporated with one or more additives and can be used as high quality paint (in case of containing a pigment or a coloring agent) and as a binder.

EXAMPLE

The present invention will now be explained in more detail by way of Examples wherein part and percentage are shown by weight unless otherwise indicated.

<Composition and Proportion of the Polymeric Composition>

(A) Composition of the Organosiloxane Components

A detailed composition of the components (A), (B) and (C) are shown in Table 1 below.

(B) Organosiloxane Component Carrying a Glycidyl Group (1) γ-Glycidoxypropyltrimethoxysilane (2) γ-Glycidoxypropyltriethoxysilane (3) γ-Glycidoxypropylmethyldiethoxysilane (C) Solvent-free, Viscosity-adjusted Silicone-acrylic Resin Component The proportion of the component (C) is shown in Table 2 below.

TABLE 1

| No. | (A) Liquid organopolysiloxane wt. % | | (B) Crosslinking agent wt. % | | (C) Curing catalyst wt. % | |
|---|---|---|---|---|---|---|
| ① | A-1 | 40 | B-1 | 62 | C-1 | 65 |
| | A-2 | 25 | B-2 | 13 | C-2 | 25 |
| | A-3 | 30 | B-3 | 10 | C-3 | 10 |
| | A-4 | 5 | B-4 | 7 | | |
| | | | B-5 | 8 | | |
| Parts by weight | 60 | | 40 | | 5 | |
| ② | A-3 | 52 | B-6 | 16 | C-1 | 65 |
| | A-1 | 30 | B-7 | 50 | C-2 | 25 |
| | A-5 | 10 | B-5 | 17 | C-3 | 10 |
| | A-6 | 8 | B-3 | 17 | | |
| Parts by weight | 70 | | 30 | | 5 | |
| ③ | A-7 | 20 | B-4 | 12 | C-1 | 65 |
| | A-1 | 35 | B-8 | 24 | C-2 | 25 |
| | A-5 | 30 | B-9 | 40 | C-3 | 10 |
| | A-6 | 15 | B-10 | 12 | | |
| | | | B-5 | 12 | | |
| Parts by weight | 75 | | 25 | | 5 | |

A-1: Methyl-ethyl series low molecular silicone (Toray-Dow Corning silicone [DC 3037])
A-2: Methyl-ethyl series low molecular silicone (Toray-Dow Corning silicone [DC 3074])
A-3: Methyl-ethyl series high molecular liquid silicone (Toray-Dow Corning silicone [SR 2414])
A-4: Methyltrimethoxysilane (Toray-Dow Corning silicone [SZ 6070])
A-5: Methyl series low molecular silicone (Toray-Dow Corning silicone [SR 2402])
A-6: Phenyltrimethoxysilane (Shin-etsu Kagaku Kogyo Co. [KBM 103])
A-7: Methyl-phenyl series high molecular liquid silicone resin (Toray-Dow Corning silicone [DC6-2230])
B-1: Phenyltrimethoxysilane
B-2: Methacryloxypropylmethyldimethoxysilane
B-3: Tetra-n-butoxysilane
B-4: Aluminum tri-sec-butyrate
B-5: Trimethoxy borate
B-6: Methyl silicate oligomer
B-7: Glycidoxypropylmethyldimethylsilane
B-8: Vinyltriacetoxysilane
B-9: Trifluorotrimethoxysilane
B-10: Tetraisopropoxy titanium
C-1: Dibutyl tin diacetate
C-2: Ethyl acetoacetate
C-3: Methyl alcohol

TABLE 2

| No. | Acrylic resin* | % | Viscosity adjusting agent** | % | Fluidity |
|---|---|---|---|---|---|
| 1 | A-9521 | 40 | KBM 103 | 60 | Present |
| 2 | A-9530 | 40 | KBM 103 | 60 | Present |
| 3 | A-9510 | 40 | KBM 103 | 60 | Present |
| 4 | A-9521 | 40 | KR 217 | 60 | Present |
| 5 | A-9530 | 40 | KR 217 | 60 | Present |
| 6 | A-9510 | 40 | KR 217 | 60 | Present |

Remarks:
*"Acrydec" (tradename) marketed by Dainippon Ink Kagaku KK a solvent-free acrylic carrying a tertiary amino group
**A silane-coupling agent marketed by Shin-etsu Kagaku KK <Test 1>

A composition of the components (A), (B) and (C) as shown in Table 3 was test under a film-forming condition of 25° C.×120 hours and the of the resultant film was measured. The results are shown in Table 3 below.

TABLE 3

| Test No. | Component (A) | | Component (B) | | Component (C) | | Surface hardness* |
|---|---|---|---|---|---|---|---|
| | No. | % | No. | % | No. | % | |
| 1 | 1 | 40 | 1 | 60 | 1 | 100 | H |
| 2 | 1 | 40 | 2 | 60 | 2 | 100 | 2H |
| 3 | 1 | 40 | 3 | 60 | 3 | 100 | 2H |
| 4 | 1 | 40 | 1 | 60 | 4 | 100 | B |
| 5 | 1 | 40 | 1 | 60 | 5 | 100 | 2B |
| 6 | 1 | 40 | 1 | 60 | 6 | 100 | 2B |
| 7 | 2 | 40 | 1 | 60 | 1 | 100 | 3H |
| 8 | 3 | 40 | 1 | 60 | 1 | 100 | 3H |

*Surface Hardness is shown in term of pencil hardness

<Test 2>

Concerning the components (A), (B) and (C), the proportion shown in Test was varied to establish new Test Nos. 9–25 and the proportions of Test Nos. 2–8 were changed to new Test Nos. 26–32 in Table 4 below. Each composition was subjected to a test under a film-forming condition of 25° C.×120 hours and the resultant film was measured for heat-resisting property, bending-resistance compliance, close adhesivity, hard combustbility, water-impermeability, acid-resistance, alkali-resistance, weather-resistance, cohesivity, gas barrier property, and impact-resistance. The results of the test are shown in Table 4 below.

In these tests, evaluation of each property was performed according to the following measuring method:

<Surface Hardness>

A test piece of the painted plate was measured according to JIS K 5400 6.14 wherein a scratch test with a pencil is stated. A result of the test are shown in terms of pencil hardness.

<Heat-resistance>

In accordance with a general testing method for paint defined in JIS K 5400, a test sample of the liquid composition was applied onto a steel panel substrate with a thickness of 0.4 mm defined in JIS G 3141 by a blowing method so as to form a paint film having a thickness of about 30 μm. The film was cured under the aforesaid condition to prepare a test sample having the film on the surface of the steel panel. This test sample was exposed to air in an electric furnace maintained at 250° C. and the surface was observed to check whether or not the surface was cracked, peeled or disclored. Evaluation of the test was made in such manner that if abnormal state was observed, the relevant item, i.e. "heat-resisting property" was marked as "absent", and on the other hand, if such abnormal state was not observed, the relevant item, i.e. "heat-resisting property" was recorded as "present".

<Bending-resisting Compliance>

Using the test sample prepared in the test of heat-resisting property (a steel panel of 0.4 mm in thickness coated with a film of the test composition), the test sample was examined according to the relevant testing method defined in JIS K 5400 6.14. The sample was bent by means of a bending tester defined in the testing method through a mandrel of 3 mm$\phi$ to check whether or not any crack or peeling was observed. Evaluation of the test was made in such manner that if crack or peeling was not observed, the item of "bending-resisting compliance" was marked as "present", but in the opposite case, "bending-resisting compliance" was marked as "absent".

<Close Adhesivity>

In accordance with JIS K 5400 6.14 for the square cut testing method, the coated surface of the test sample was cross-notched by 6 times with a cutter knife so as to form squares at intervals of 1.0 mm and a cellophane tape was then allowed to closely adhere to the square cut portion of the sample. The tape was then peeled from the surface of the coated sample and the condition of the coated surface was observed to check adhesivity. In case no peeling nor injury occurred, evaluation of adhesivity was 25/25. In case peeling occurred, the number of peeled squares was counted to deduct the number from 25/25.

<Hard Combustibility>

In accordance with a testing method for hard combustible materials Table 8.2 defined by the Construction Finish Industry of Japan, the item of hard combustibility is examined. If a sample clears the condition of "6 minutes at standard heating curve", the sample will be judged to be hard combustible and the item "Hard combustibility" is marked as "present". In case the sample does not satisfy the condition, this item will be marked as "absent".

<Water-impermeability>

Toyo filter paper No. 6 was selected as a material to be coated and the paint sample was coated on the material to form a sample for the water-impermeability. This sample was placed on a natural filtering funnel and water was poured into the funnel. If no water was filtered through the funnel, the sample was recognized to be water-impermeable so that the item "Water-impermeability" was marked as "present". In case the sample does not satisfy this condition, the item of "Water-impermeability" was recorded as "absent".

<Acid-resistance>

A glass plate was coated with the paint to be tested to form a test sample. In accordance with a testing method defined in JIS K 5400 7.5, the test sample was dipped in a 5% by weight of sulfuric acid solution at 20° C. for 30 days to examine the surface of the test sample. If an abnormal phenomenon such as swelling, bubbling, the formation of holes, softening, peeling or dissolution does not take place, the item of "Acid resistance" is marked as "absent". If such phenomenon is observed on the contrary, the item "Acid resistance" will be recorded as "present".

<Alkali Resistance (Na Resistance)>

On the coated surface of the test sample was placed about 5 cc of caustic soda (NaOH) solution the pH value of which had been adjusted to 10, and the sample was allowed to stand for 24 hours at room temperature, while wrapping the sample with a curved watch glass to prevent evaporation of the solution. The coated surface was washed with water and watched to determine whether any change occurred or not. If no change was observed, the item of "Alkali resistance" was marked as "present". On the contrary, if any change (such as dissolution) occurred, this item was recorded as "absent".

<Weather Resistance (Weather-o-meter)>

Using a QUV type weather-o-meter (a range of wave length: 280–320 nm), the test sample was exposed for 2500 hous in a cycle of irradiation at 15° C. and dew, and luster of the coated surface was measured to obtain a rate of decreasing luster (%) by comparing the luster before and after exposure. If the rate of decreasing luster of the sample was within 10%, the item of "Weather resistance" was recorded as "present". If the rate of decreasing luster was higher than 10%, the item of "Weather resistance" was recorded as "absent".

<Cohesivity>

A mixed liquid of the test composition was poured into a mold (40×40×15 cm) manufactured on a steel plate substrate, cured for 7 days at 25° C. to form a siloxane cured sample bound to the steel pate. In accordance with a testing method defined by Architectural Research Institute belonging to Ministry of Construction, an attachment of a testing machine was bound with an epoxy resin type binder and pulled upward by oil pressure of the testing machine whereby a load necessary for peeling off the substrate from the siloxane cured product at the cohesion surface existing therebetween was measured to obtain a cohesive power in terms of kg/cm$^2$ and concurrently the cohesivity was evaluated.

<Gas Barrier Property>

In a chamber maintained at 20° C. and a relative humidity of 65±5%, a free film (film thickness: 1.2 mm) of the sample was prepared and cured for 7 days. Using a sample (18 mm$\phi$) punched out from the aforesaid film sample, a transmission amount of oxygen through the sample was measured by the aid of a Kaken-type oxygen transmission meter whereby the amount of oxygen less than $5.0 \times 10^{-2}$ mg/cm$^2$·day was evaluated as "present" for the item of "Gas barrier property", but the amount of at least $5.0 \times 10^{-2}$ mg/cm$^2$·day was evaluated as "absent".

<Impact Resistance>

In accordance with a method for measuring impact resistance defined in JIS K 5400 8.3, a plate coated with the paint sample was subjected to the test using a DuPont type test instrument of ½ inch×500 g×30 cm to check break or peeling of the coated film. If no abnormal state was observed, evaluation of the item "Impact resistance" was recorded as "present". In contrast, if abnormal state was detected, the item of "Impact resistance" was recorded as "absent".

Its understood that the preceding Example may be varied within the scope of the specification both as to the components and treating conditions by those skilled in the art to achieve essentially the same results.

As many widely different embodiments of this invention may be made without departing from the spirit and scope thereof, it is to be construed that this invention is not limited to the specific embodiments thereof except as defined in the appended claims.

TABLE 4

| Test No. | Table 3 No. | 1st, Liq. (A):(B) mixing ratio | *1 | 2nd, Liq. (c)*1 | *2 | *3 | *4 | *5 | *6 | *7 | *8 | *9 | *10 | *11 | *12 |
|---|---|---|---|---|---|---|---|---|---|---|---|---|---|---|---|
| 9 | 1 | 10:90 | 50 | 50 | **P | **A | 0/25 | P | P | P | P | P | 5 | P | P |
| 10 | 1 | 20:80 | 50 | 50 | P | P | 10/25 | P | P | P | P | P | 10 | P | P |
| 11 | 1 | 30:70 | 50 | 50 | P | P | 25/25 | P | P | P | P | P | 35 | P | P |
| 12 | 1 | 40:60 | 50 | 50 | P | P | 25/25 | P | P | P | P | P | 40 | P | P |
| 13 | 1 | 50:50 | 50 | 50 | P | P | 25/25 | P | P | P | P | P | 40 | P | P |
| 14 | 1 | 60:40 | 50 | 50 | P | P | 25/25 | P | P | P | P | P | 40 | P | P |
| 15 | 1 | 70:30 | 50 | 50 | P | P | 15/25 | P | P | P | P | P | 35 | P | P |
| 16 | 1 | 80:20 | 50 | 50 | P | A | 10/25 | P | P | P | P | P | 15 | P | P |
| 17 | 1 | 90:10 | 50 | 50 | P | A | 0/25 | P | P | P | P | P | 10 | P | P |
| 18 | 1 | 40:60 | 90 | 10 | P | A | 0/25 | P | P | P | P | P | 10 | P | P |
| 19 | 1 | 40:60 | 80 | 20 | P | P | 10/25 | P | P | P | P | P | 15 | P | P |
| 20 | 1 | 40:60 | 70 | 30 | P | P | 25/25 | P | P | P | P | P | 30 | P | P |
| 21 | 1 | 40:60 | 60 | 40 | P | P | 25/25 | P | P | P | P | P | 40 | P | P |
| 22 | 1 | 40:60 | 40 | 60 | P | P | 25/25 | A | P | P | P | P | 40 | P | P |
| 23 | 1 | 40:60 | 30 | 70 | P | P | 25/25 | A | P | P | P | P | 30 | P | P |
| 24 | 1 | 40:60 | 20 | 80 | A | A | 15/25 | A | P | A | P | P | 10 | P | P |
| 25 | 1 | 40:60 | 10 | 90 | A | A | 10/25 | A | P | A | P | P | 5 | P | P |
| 26 | 2 | 40:60 | 50 | 50 | P | P | 25/25 | P | P | P | P | P | 25 | P | P |
| 27 | 3 | 40:60 | 50 | 50 | P | P | 25/25 | P | P | P | P | P | 20 | P | P |
| 28 | 4 | 40:60 | 50 | 50 | P | P | 20/25 | P | P | P | P | P | 20 | P | P |
| 29 | 5 | 40:60 | 50 | 50 | P | P | 25/25 | P | P | P | P | P | 40 | P | P |
| 30 | 6 | 40:60 | 50 | 50 | P | P | 25/25 | P | P | P | P | P | 40 | P | P |
| 31 | 7 | 40:60 | 50 | 50 | P | P | 20/25 | P | P | P | P | P | 20 | P | P |
| 32 | 8 | 40:60 | 50 | 50 | P | P | 20/25 | P | P | P | P | P | 20 | P | P |

*1: Amount incorporated wt. %
*2: Heat-resisting property
*3: Bending-resistance compliance
*4: Close adhesivity
*5: Hard combustivility
*6: Water-impermeability
*7: Acid-resistance
*8: Alkali-resistance
*9: Weather resistance
*10: Cohesivity
*11: Gas barrier property
*12: Impact resistance
**P: present
**A: absent

What is claimed is:

1. A solvent-free two-liquid type curable liquid polymeric composition which comprises:

(I) a first liquid composition comprising:
(A) an organosiloxane component comprised of:
(a) one or more liquid organopolysiloxanes of the general formula:

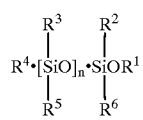

(1)

wherein $R^1$ stands for a hydrogen atom, an alkyl group with 1–5 carbon atoms or an acyl group; $R^2$ to $R^6$ are the same or different and each stands for a hydrogen atom, —$OR^1$ or a univalent hydrocarbon group; and n is an integer of 1–15,
(b) a crosslinking agent comprising one or more organometallic compounds of the general formula:

$$R^7{}_p M \cdot (OR^1)_{3-p} \quad (2)$$

or $$R^7{}_m Q \cdot (OR^1)_{4-m} \quad (3)$$

wherein M stands for aluminum or boron element; Q for silicon, titanium or zirconium element; $R^1$ for a hydrogen atom, an alkyl group with 1–5 carbon atoms, an acyl group or an oxime group; $R^7$ for a hydrogen atom, —$OR^1$ or a univalent hydrocarbon group; p for an integer of 1 or 2; and m for an integer of 1–3, and
(c) a curing catalyst which is one or more organometallic compounds of zinc, cobalt, aluminum or tin element; said curing catalyst has been incorporated with at least one of a catalytic reaction blocking agent and an alcohol, and
(B) an organosiloxane carrying a glycidyl group, and
(II) a second liquid comprised of:
(C) a solvent-free acrylic copolymer carrying a tertiary amino group; said solvent-free acrylic copolymer having a silicone compound added thereto.

2. The liquid polymeric composition according to claim 1, wherein the solvent-free acrylic copolymer (C) is a substantially solvent-free acrylic copolymer formed by substituting at least 95% of an organic solvent of an acrylic copolymer carrying a tertiary amino group by a silicone.

3. The liquid polymeric composition according to claim 1, wherein the solvent-free acrylic copolymer (C) is an acrylic copolymer carrying a tertiary amino group.

4. The liquid polymeric composition according to claim 1, wherein the solvent-free acrylic copolymer (C) has an amine number of 19 and an acid number of not more than 3.

5. The liquid polymeric composition according to claim 1, wherein the mixing ratio of (A)/(B) is 40/60.

6. The liquid polymeric composition according to claim 1, wherein a mixing ratio of the first liquid/the second liquid is in the range of 45–55 to 55–45.

7. The liquid polymeric composition according to claim 1, wherein 400 parts by weight of one or more additives selected from the group consisting of an activating agent, a filler, a pigment, and a coloring agent are incorporated per 100 parts by weight of the liquid organopolysiloxane (a) in the first liquid composition.

8. The paint comprising the liquid polymeric composition according to claim 1, wherein at least one of the following is added: pigments and coloring agents.

9. The binder comprising the liquid polymeric composition according to claim 1, wherein at least one of the following is added: pigments and coloring agents.

* * * * *